United States Patent [19]

Oas et al.

[11] Patent Number: 5,643,619

[45] Date of Patent: Jul. 1, 1997

[54] ARTICLE REPOSITIONING APPARATUS FOR AN INJECTION STRETCH BLOW MOLDING MACHINE

[75] Inventors: David C. Oas, Vandalia; Lynn R. Maggert, Sr., Tipp City; James C. Turner, Cincinnati, all of Ohio

[73] Assignee: Electra Form, Inc., Vandalia, Ohio

[21] Appl. No.: 574,201

[22] Filed: Dec. 18, 1995

[51] Int. Cl.[6] ................................................. B29C 49/42
[52] U.S. Cl. .................................... 425/534; 198/468.3
[58] Field of Search ............................ 425/534, 341, 425/403.1, 526; 198/468.3

[56] References Cited

U.S. PATENT DOCUMENTS

| | | | |
|---|---|---|---|
| 4,106,886 | 8/1978 | Sokolow | 425/534 |
| 4,197,073 | 4/1980 | Rees et al. | 425/533 |
| 4,313,905 | 2/1982 | Hafele | 425/533 |
| 4,323,341 | 4/1982 | Valyi | 425/534 |
| 4,709,803 | 12/1987 | Swiderski | 425/534 |
| 5,114,327 | 5/1992 | Williamson et al. | 425/526 |
| 5,206,039 | 4/1993 | Valyi | 425/534 |
| 5,273,152 | 12/1993 | Brun | 198/468.3 |
| 5,447,426 | 9/1995 | Gessner et al. | 425/526 |
| 5,468,443 | 11/1995 | Takada et al. | 425/534 |

FOREIGN PATENT DOCUMENTS

61-125833   6/1986   Japan ..................................... 425/534

*Primary Examiner*—Robert Davis
*Attorney, Agent, or Firm*—Locke Reynolds

[57] ABSTRACT

An article repositioning apparatus for an injection stretch blow molding machine is disclosed for simultaneously molding a plurality of containers from plastic parisons. Between work stations, the apparatus repositions articles from a compact, evenly spaced first position to an extended, unevenly paired second position. After insertion of the articles into receivers slidably mounted on tracks, the receivers are moved by a servo motor to various separations by sliding movement along the tracks, the receivers attached to aligning ribs threadably engaged with ball screws. Simultaneously, the tracks are moved by a second servo motor to uneven paired separations by attachment to movable scissors having large and small scissor portions.

34 Claims, 6 Drawing Sheets

ARTICLE REPOSITIONING APPARATUS FOR AN INJECTION STRETCH BLOW MOLDING MACHINE

BACKGROUND OF THE INVENTION

1. Field of the Invention

The present invention relates generally to apparatus for the manufacture of plastic bottles and other similar containers, and particularly to apparatus for the simultaneous manufacture of a large number of containers from preforms according to known general parameters, wherein apparatus is provided for repositioning the preforms which are injection molded at one spacing in preparation for blow molding the preforms to form containers at another spacing.

2. Description of the Prior Art

The production of plastic articles is often facilitated by performing various operations and treatments at a series of work stations, in order to efficiently obtain the desired final articles. As part of performing such operations and treatments, is often the case that the work stations require different relative center spacings of parisons. For instance, where starting material is injection molded to form parisons at an initial work station, close center spacings are often needed due to the difficulty of maintaining the required molten plastic temperature over relatively long flow paths, while at a later work stations, such as a blow molding work station, parisons are expanded, necessitating larger relative center spacings between parisons to permit such expansion. In addition, processing of parisons at later work stations is frequently aided by pairwise disposition of the parisons. As a result, it is often desirable to increase efficiency by increasing the relative center spacings of the parisons from relatively compact, even spacings to relatively extended, paired spacings as the parisons move from one work station to another. The array of available apparatus for repositioning preforms includes apparatus whereby the relative center spacings of a set of parisons disposed in a rectangular array may be varied in a single direction, for example, as described in U.S. Pat. No. 4,197,073, disclosing an apparatus having diverging tracks acting to expand the center spacings of the parisons in a single direction. In addition, apparatus is described in U.S. Pat. No. 4,323,341 whereby parisons are spread in a single direction to accommodate the center spacings required for blow molding, and further, apparatus is described in U.S. Pat. No. 4,313,905 where the relative center spacings of a set of preforms disposed in a linear array may be varied through the use of a carrier block rack having a plurality of angular tines.

Also, there are presently available apparatus for altering the relative spacings, in two directions, between the members of a set of parisons disposed in a rectangular array. A number of embodiments of one such device are described in U.S. Pat. No. 5,273,152. In a first such embodiment, the spreading of parisons between a first center spacing and a second center spacing is controlled by relative movement of the parisons with respect to a guide plate having a plurality of angled grooves. In a second embodiment, a single pantograph scissor unit is employed to expand the parisons in a first direction with the parisons maintained to be evenly spaced, while a piston and rod structure is employed to expand the outer pair of rows of parisons in an orthogonal second direction. In another device, described by U.S. Pat. No. 5,206,039, apparatus for conditioning pressure molded plastic articles is disclosed, and includes a means operative to change the center spacings of parisons between an evenly spaced, compact first center spacing and an evenly spaced, expanded second center spacing, the change in center spacings occurring during movement of the parisons from a pressure molding section to a conditioning section.

Despite the availability of such apparatus, there exists a need in the art for an article repositioning apparatus for altering in two directions the relative center spacings of a set of parisons disposed in a two-dimensional array between an evenly spaced first position and a relatively expanded, paired unevenly spaced second position, for use with an injection stretch blow molding machine for simultaneously molding a plurality of containers from plastic parisons, the machine having a first work station where the parisons are disposed in the first position and a second work station where the parisons are disposed in the second position

SUMMARY OF THE INVENTION

In order to aid in the understanding of the present invention, it can be stated in essentially summary form that, with respect to an injection stretch blow molding machine for simultaneously molding a plurality of containers from plastic parisons, the machine including a first work station wherein the parisons are disposed in a first position and a second work station wherein the parisons are disposed in a second position with spacings between the parisons greater than in the first position, the present invention is directed to an apparatus that is capable of altering the spacings between the parisons between the first position and the second position.

More specifically, the present invention is directed to an article repositioning apparatus for an injection stretch blow molding machine for simultaneously molding a plurality of containers from plastic parisons, the machine including a first work station where parisons are disposed in a relatively compact, evenly spaced first position and a second work station where parisons are disposed in a pairwise unevenly spaced second position with spacings between parisons greater than in the first position. The apparatus of the present invention includes a frame coupled to the first work station and the second work station, and a base having a plate with a generally planar surface, the base vertically movable with respect to the frame using an actuator means and inner and outer guide means. A plurality of parallel ways extend in a first direction and are coupled to the base. A set of tracks extends in a second direction orthogonal to the first direction, the tracks including a fixed track and a plurality of movable tracks. The movable tracks include a first group of movable tracks and a second group of movable tracks, the members of the second group interposed in alternating position with respect to members of first group of movable tracks. The fixed track is disposed proximate to the movable tracks and adjacent to a member of second group of movable tracks. Coupled to each movable track are way bearings, with at least one way bearing engaging each way, thereby permitting relative sliding movement of each movable track with respect to the base. Each way includes a support rail fixed to the planar surface of the plate, supporting the movable tracks for movement in the first direction.

Linking elements are coupled together and to the tracks to permit variation of spacings between tracks. Preferably, linking elements are formed of a pair of sets of movable scissor levers, the sets of movable scissor levers coupled to opposite ends of the fixed track and each movable track. Each set of movable scissor levers includes smaller scissor levers coupled to the fixed track and to members of first group of movable tracks, and larger scissor levers coupled to members of second group of movable tracks and to the smaller scissor levers. Coordinated movement of each of the sets of scissor levers causes variation in spacings between the fixed track and each movable track, whereby the movable tracks are capable of movement between a relatively compact, even spacing corresponding to the first position, and a relatively extended, paired uneven spacing corresponding to the second position.

Parison receivers are mounted on the tracks, with each parison receiver including a tubular element having an open upper end, a closed lower end, a linear bearing, and an adapter plate including a cam follower. The linear bearings couple each lower end to one of the tracks so that each tubular element is mounted to and slidably movable along one of the tracks. The closed lower end of each parison receiver may include a vacuum channel coupled to a source of vacuum and to the interior of the tubular element using a sliding spool. The sliding spool is captured within the tubular element and has a spool upper end which extends into an insert disposed within the tubular element. Each tubular element may include a pair of vertical vacuum channels and horizontal stub channels which couple the vacuum to a small annular space separating the lower portion of the spool from the interior surface of the tubular element. The small annular space couples the vacuum to a second space existing between the bottom of the spool and the closed lower end, and a spring biases the spool away from the closed lower end. The spool includes vertical channels running from the bottom of the spool to a concave dished surface at the top of the spool, a circular channel, and a pair of intersecting horizontal channels terminating in the circular channel. The small dimension existing between the outer surface of the spool and the inner surface of the tubular element below the channel allows only a small flow of air down the interior of the insert through vertical channels into the second space. The throttling action of this close space insures that when the spool is situated separate from the interior of closed lower end, there is very little flow of air into the vacuum line. This small flow of air is sufficient to aid in the capture of parisons as hereinafter described.

Parallel aligning ribs extend in the first direction, disposed parallel to the ways, and are coupled to the cam followers for aligning the parison receivers with respect to the ways. Coupling components act to couple the aligning ribs together at preselected variable spacings. The coupling components include a pair of ball screws, with the ball screws disposed in the second direction at opposite ends of the aligning ribs. Each ball screw is formed to have a contiguous first segment group with right-hand threads, and a contiguous second segment group with left-hand threads. In addition, the first segment group includes first inner segment and a first outer segment, with the relatively fine thread pitch of the first inner segment less than the relatively coarse thread pitch of the first outer segment. Similarly, the second segment group includes a second inner segment and a second outer segment, with the relatively fine thread pitch of the second inner segment less than the relatively coarse thread pitch of the second outer segment. The ball screws are supported for rotation with respect to the base by ball screw bearings. Ball nuts are attached to the aligning ribs and threadably engage the ball screws, with each ball nut engaging a member of the first segment group or the second segment group having corresponding thread pitch and sense. By simultaneous rotation of the ball screws, the aligning ribs are movable through varying distances due to of attachment of the aligning ribs to the ball nuts. Those aligning ribs attached to ball nuts engaged with members of the first segment group are caused to move oppositely to those aligning ribs fixed to ball nuts engaged with members of the second segment group, as the first segment group has threads of opposite sense to that of the second segment group. In addition, as a result of the relatively fine thread pitch of the first inner segment being less than the relatively coarse thread pitch of the first outer segment, simultaneous rotation of the ball screws causes the aligning ribs fixed to ball nuts engaged with the first segment group and disposed relatively more proximate to the second segment group to be moved through relatively smaller distances than the aligning ribs fixed to the ball nuts engaged with the first segment group and disposed relatively less proximate to the second segment group. Similarly, as a result of the relatively fine thread pitch of the second inner segment being less than the relatively coarse thread pitch of the second outer segment, simultaneous rotation of the ball screws causes the aligning ribs fixed to ball nuts engaged with the second segment group and disposed relatively more proximate to the first segment group to be moved through relatively smaller distances than the aligning ribs fixed to the ball nuts engaged with the second segment group and disposed relatively less proximate to the first segment group.

The movement of the linking elements is effectuated by a reversible first servo motor coupled to a small drive pulley using a drive belt. The small drive pulley is attached to a drive shaft supported for rotation by drive shaft bearings. A large drive pulley is attached to each end of the drive shaft, and similarly, idler pulleys are attached to each end of an idler shaft rotatably mounted through idler shaft bearings. Each large drive pulley is rotatably coupled to an idler pulley by a timing belt. The movable scissors levers are coupled to the timing belts by timing belt clamps, so that the first servo motor causes the movable tracks, and hence the parison receivers, to move in the first direction relative to the base.

The ball screws are rotationally coupled together using a ball screw coupling belt mounted between a pair of ball screw pulleys. A ball screw pulley is attached to each end of each ball screw, with a reversible second servo motor coupled to one of the ball screws. In this way, the second servo motor acts to produce movement of the aligning ribs in the second direction relative to the base, moving the parison receivers in the second direction. A controller coupled to the first and second servo motors is used to associate and coordinate movement of the parison receivers between spacings corresponding to the first position and the second position, by way of actuation of the first servo motor and contemporaneous actuation of the second servo motor, as will next be described.

In use, the machine transports parisons disposed with relative center spacings of the first position from the first work station and positions the parisons above the parison receivers. The actuator means moves the base vertically upward, so that each parison engages a parison receiver. The parisons are generally of a test tube shape with a rounded bottom and a support flange separating a lower body portion from a finish portion intended to engage a closure. The curvature of the dish-shaped upper surface of the spool conforms generally with the outer surface the bottom end of a parison. After insertion of a parison into a parison receiver, the upper ends of the vertical channels are obstructed, substantially restricting the flow of air down the vertical channels and into the second space. The absence of this flow of air causes the vacuum within the second space to increase, resulting in a net downward force on the spool by air pressure acting on the parison. The differential air pressure overcomes the force of the spring and produces a relative downward movement of the spool towards the closed lower end. The downward translation of the spool couples the horizontal channels in the tubular element with the circular channel and the horizontal intersecting channels which operates to latch the spool in the downward position and maintains a hard vacuum hold on the parison, until such time as the parison is forcibly removed. The parisons are released from the machine, and the first and second servo motors are then energized by the controller. The first servo motor produces movement of the large drive pulleys coupled by the small drive pulley, drive belt, and drive shaft, with rotation of large drive pulleys moving the timing belts. Each set of movable scissor levers, attached to a timing belt by a timing belt clamp, expands as a result of translation of timing belts clamps with movement of the timing belts. During such expansion, each set of movable scissors remains fixed at a point where attached to the fixed track, with the remainder of each set of scissor levers expanding relative to the fixed track. The movable tracks thereby translate with respect to the fixed track, with the way bearings sliding within the ways.

In the first position, the tracks are disposed compactly and evenly spaced. In the second position, corresponding to sets of scissors levers as extended, the tracks are relatively separated and are disposed unevenly and pairwise, due to attachment of the smaller scissor levers and the larger scissor levers to members of the first and second groups of movable tracks, respectively. Second servo motor provides drive directly to one ball screw, with coupling to the other ball screw using the ball screw coupling belts and the ball screw pulleys. Simultaneous rotation of the ball screws causes translation of the aligning ribs parallel to the ball screws. The aligning ribs attached to those ball nuts engaged with members of the first segment group move oppositely to those aligning ribs fixed to the ball nuts engaged with members of the second segment group, as the first segment group has threads of opposite sense to the second segment group. Further, as the relatively fine thread pitch of the first inner segment is less than the relatively coarse pitch of the first outer segment, simultaneous rotation of the ball screws causes the aligning ribs fixed to ball nuts engaged with the first segment group and disposed relatively more proximate to the second segment group to be moved through relatively smaller distances than the aligning ribs fixed to the ball nuts engaged with the first segment group and disposed relatively less proximate to the second segment group, and similarly, causes the aligning ribs fixed to ball nuts engaged with the second segment group and disposed relatively more proximate to the first segment group to be moved through relatively smaller distances than the aligning ribs fixed to the ball nuts engaged with the second segment group and disposed relatively less proximate to the first segment group. Consequently, simultaneous rotation of the ball nuts causes the parison receivers to slidably translate along the tracks through attachment to the aligning ribs fixed to the ball nuts, between a compact configuration corresponding to the first position and an extended configuration corresponding to the second position.

With the parison receivers moved from the first position to the second position, the parisons may then be transported by the machine from the apparatus of the present invention to the second work station, where further operative steps on the parisons may be performed. As the controller reverses the direction of drive of the first and second servo motors, the tracks and the aligning ribs are caused to each move in the opposite sense, from the second position to the first position, so that the present invention is ready for engagement with another set of parisons emerging from the first work station.

In a second embodiment, the first and second servo motors are replaced by a reversible single servo motor coupled to the timing belts and to the ball screws. The single servo motor thus provides the motive force to cause the movable tracks to move in the first direction in response to action by the movable scissors, and to cause the aligning ribs to move in the second direction in response to rotation of the ball screws, thereby moving the parison receivers between the first and second positions.

It is an object of the present invention to provide an article repositioning apparatus for an injection stretch blow molding machine whereby the center spacing of parisons can be altered in two directions.

It is a further object of the present invention to provide an article repositioning apparatus for an injection stretch blow molding machine for altering in two directions the relative center spacings of parisons between a compact, evenly spaced first position and an expanded, paired unevenly spaced second position.

It is another object of the present invention to provide an article repositioning apparatus for an injection stretch blow molding machine which can alter the center spacing of parisons without interruption of the operation of the machine.

It is another object of the present invention to provide an article repositioning apparatus for an injection stretch blow molding machine that quickly and efficiently alters in two directions the relative center spacings of parisons between a first position and a second position.

It is yet another object of the present invention to provide an article repositioning apparatus for an injection stretch blow molding machine having components of sturdy construction and that may be easily adjusted, serviced and repaired.

Further objects and advantages of the present invention will be apparent from a study of the following portion of the specification, the claims, and the attached drawings.

DESCRIPTION OF THE PREFERRED EMBODIMENTS

The following portion of the specification, taken in conjunction with the drawings, sets forth the preferred embodiments of the present invention. The embodiments of the invention disclosed herein are the best mode contemplated by the inventor for carrying out the invention in a commercial environment, although it should be understood that various modifications can be accomplished within the parameters of the present invention.

Figure 1:
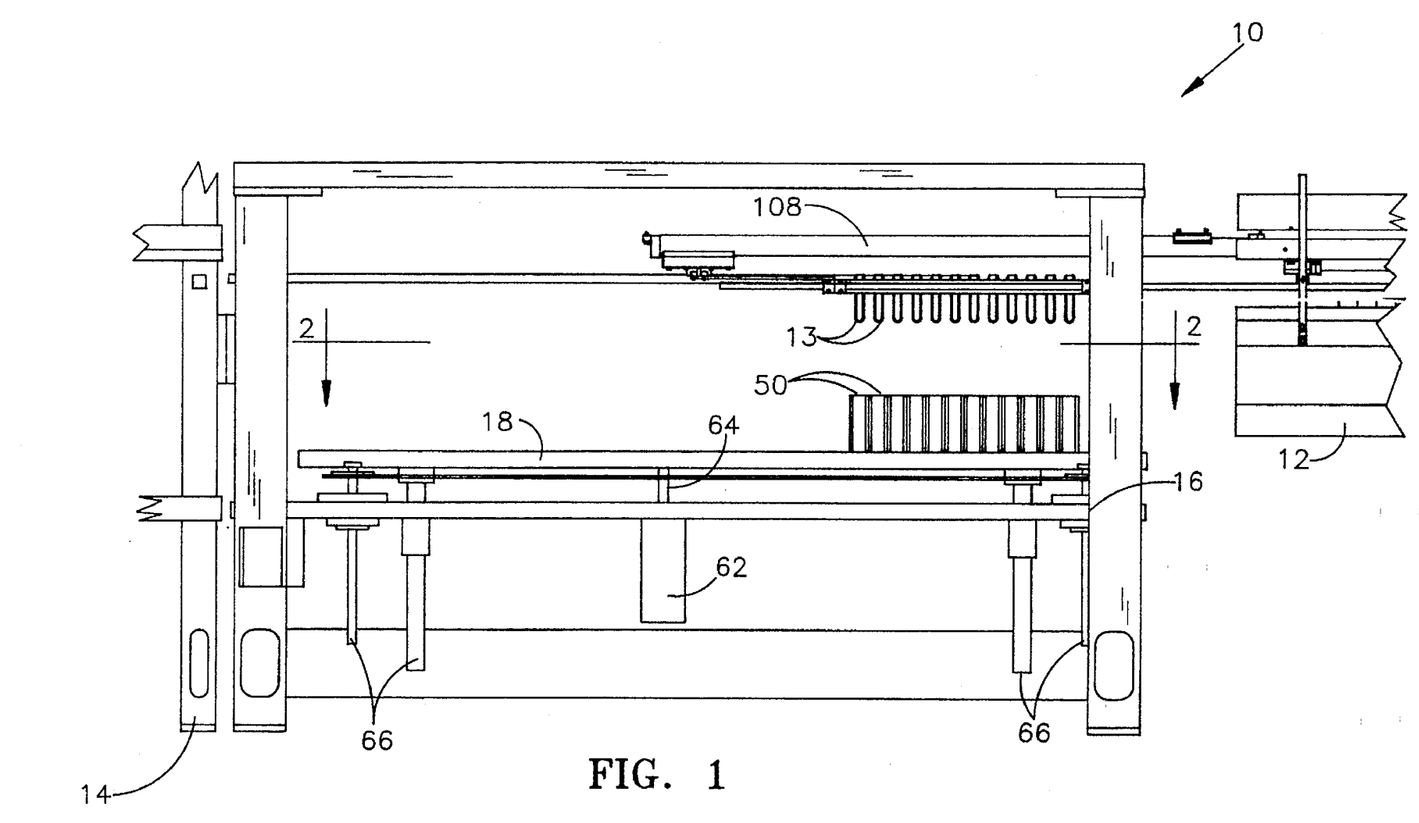
FIG. 1 is a side elevation view of a portion of an injection stretch blow molding machine including an article repositioning apparatus representing the present invention.
Figure 2:
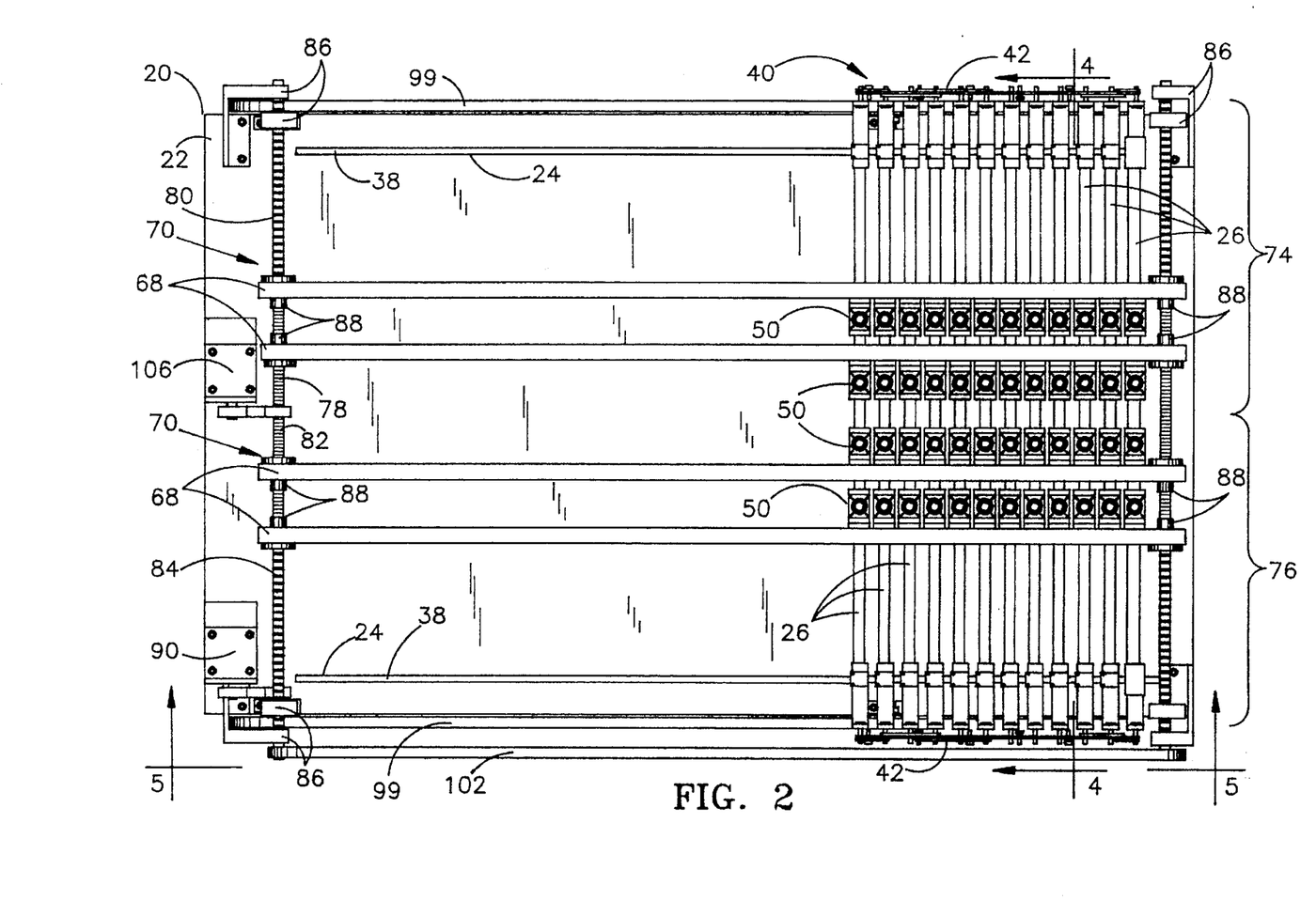
FIG. 2 is a plan view of an article repositioning apparatus for an injection stretch blow molding machine representing the present invention, taken along line 2—2 of FIG. 1 and depicted in a first position where parison receivers are disposed with relatively small spacings therebetween.
Figure 3:
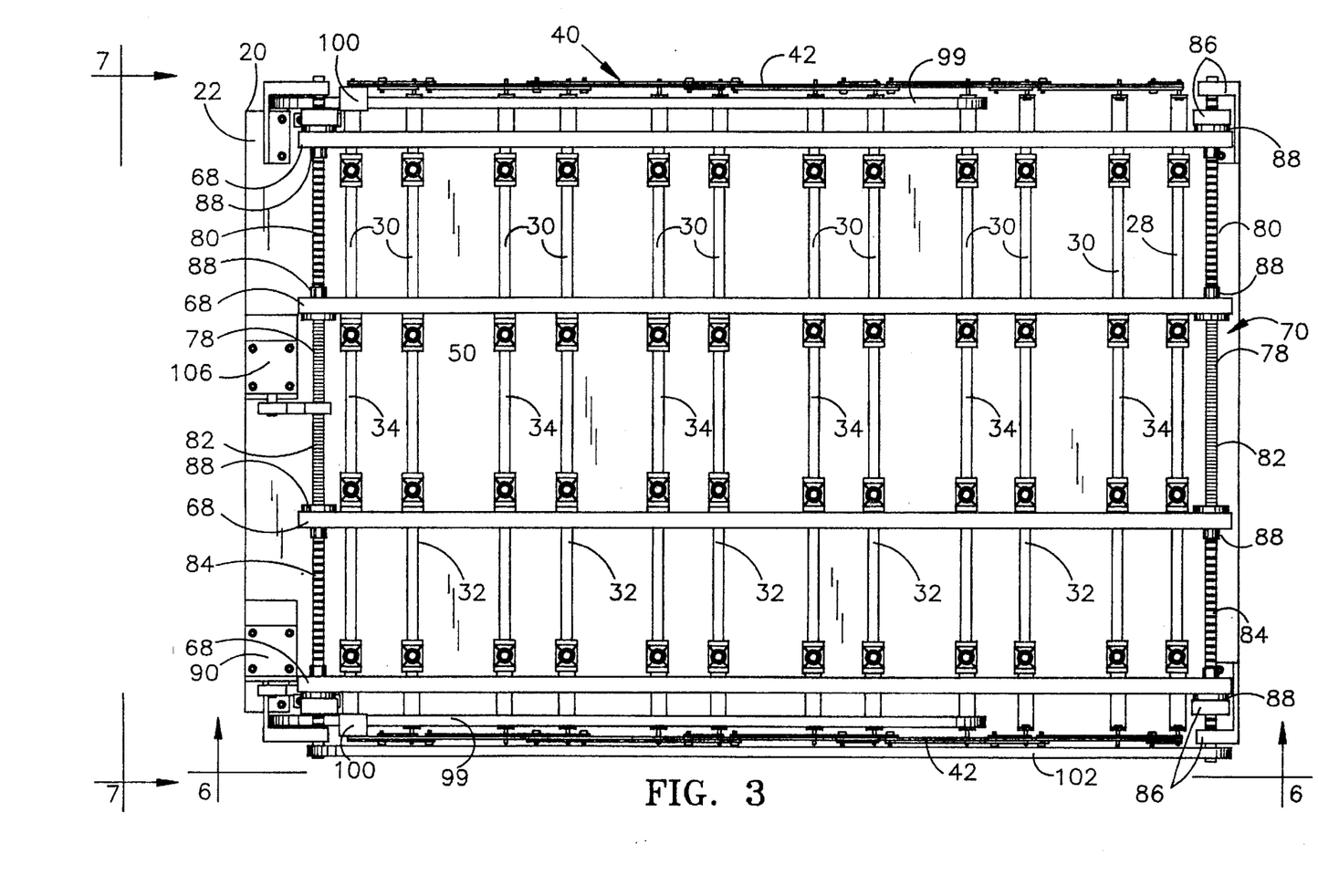
FIG. 3 is plan view of an article repositioning apparatus for an injection stretch blow molding machine representing the present invention, similar to FIG. 2, but depicted in a second position where parison receivers are disposed with relatively large spacings therebetween.
Figure 4:
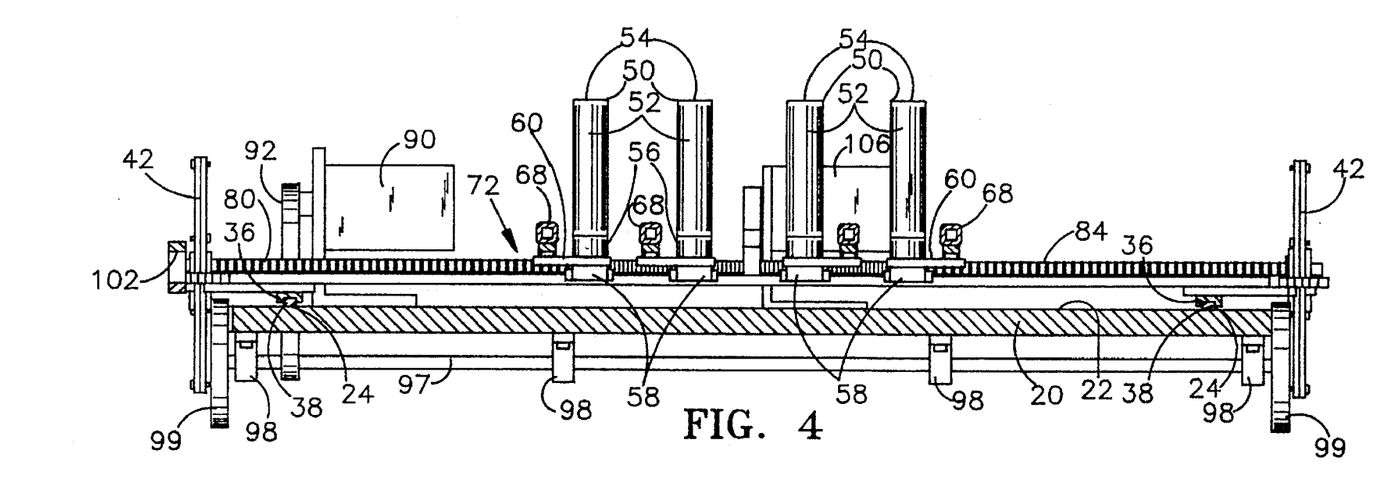
FIG. 4 is an end elevation view of an article repositioning apparatus for an injection stretch blow molding machine representing the present invention, taken along line 4—4 of FIG. 2.
Figure 5:
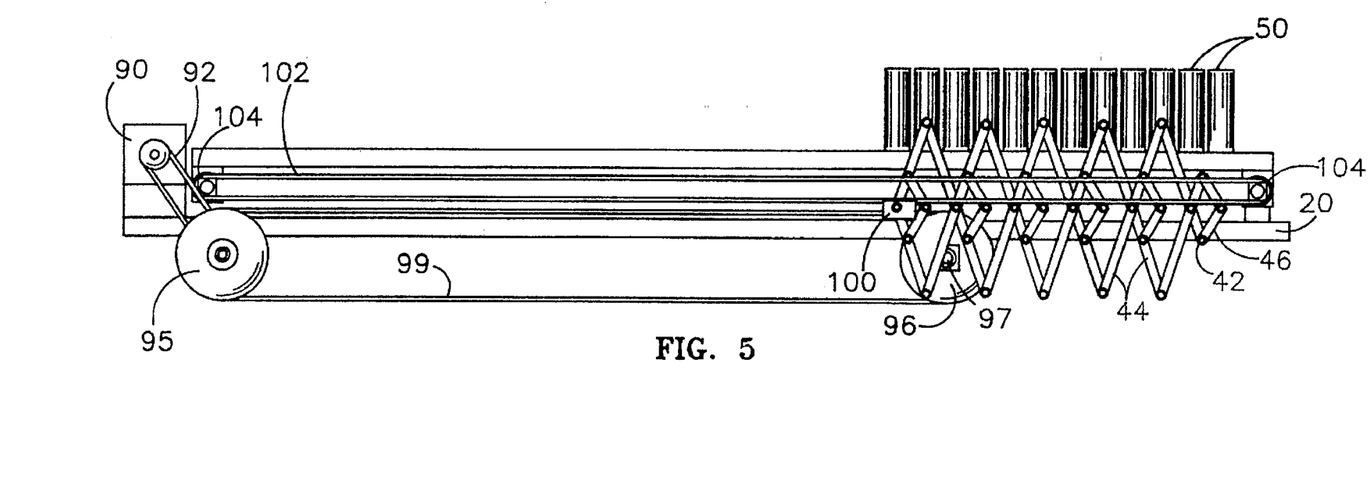
FIG. 5 is a side elevation view of an article repositioning apparatus for an injection stretch blow molding machine representing the present invention, taken along line 5—5 of FIG. 2.

Referring now to the drawings for a detailed description of the present invention, reference is first made to FIGS. 1–3, generally depicting an injection stretch blow molding machine 10 for simultaneously molding sets of 48 containers from plastic parisons. Machine 10 includes a first work station 12 where parisons 13 are disposed in a relatively compact, evenly spaced first position and second work station 14 where parisons 13 are disposed in a pairwise unevenly spaced second position with spacings between parisons 13 greater than in the first position. As partially depicted in FIG. 1, it is contemplated that first work station 12 may be a vertical clamp, 48 cavity preform injection module, and that second work station 14 may be a stretch blow molding module. The apparatus of the present invention includes frame 16 coupled to first work station 12 and second work station 14, and base 18 having plate 20 with generally planar surface 22, with base 18 vertically movable with respect to frame 16. Parallel ways 24 extend in a first direction and are coupled to base 18, and a set of tracks 26 extends in a second direction orthogonal to the first direction, with tracks 26 including fixed track 28 and movable tracks 30. Movable tracks 30 include a first group of movable tracks 32, and a second group of movable tracks 34, with members of the second group of movable tracks 34 interposed in alternating position with respect to members of first group of movable tracks 32. Although twelve tracks 26 are depicted in FIGS. 1–7, it will be understood that a greater or lesser number of tracks 26 may be utilized within the scope of the present invention. Fixed track 28 is disposed proximate to movable tracks 30 and adjacent to a member of second group of movable tracks 34. Coupled to each movable track 30 are way bearings 36, with at least one way bearing 36 engaging each way 24, thereby permitting relative sliding movement of each movable track 30 with respect to base 18. Each way 24 includes a support rail 38 fixed to plate 20, supporting movable tracks 30 for movement in the first direction.

Figure 6:
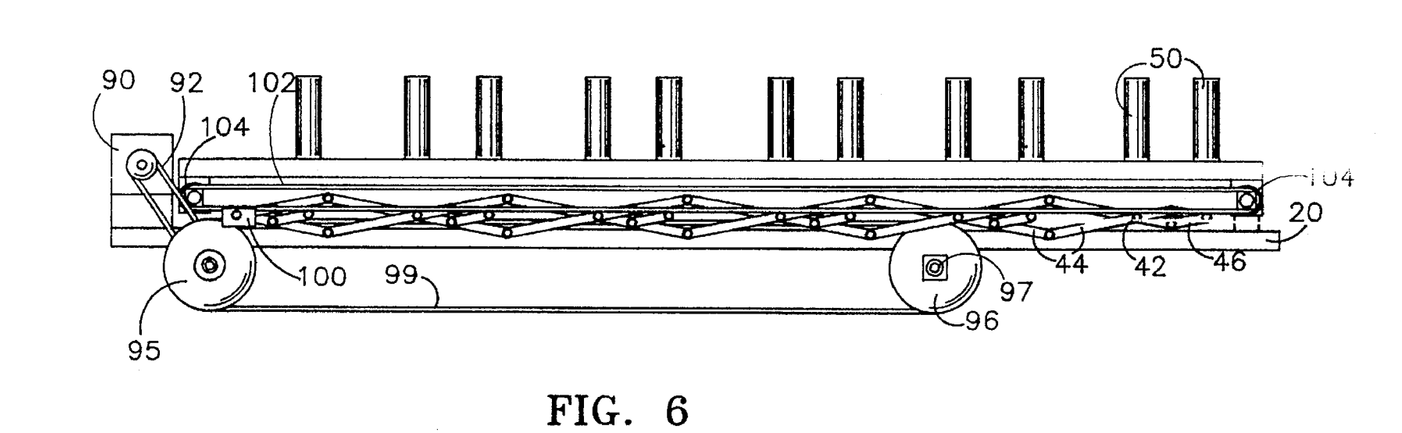
FIG. 6 is a side elevation view of an article repositioning apparatus for an injection stretch blow molding machine representing the present invention, taken along line 6—6 of FIG. 3.

As seen most clearly in FIGS. 2–3 and 5–6, linking elements 40 are coupled together and to tracks 26 to permit variation of spacings between tracks 26. Preferably, linking elements 40 are formed of a pair of sets of movable scissor levers 42, each coupled to an end of fixed track 28 and each movable track 30. Each set of movable scissor levers 42 includes smaller scissor levers 46 coupled to fixed track 28 and to members of first group of movable tracks 32, and larger scissor levers 44 coupled to members of second group of movable tracks 34 and to smaller scissor levers 46. Coordinated movement of the sets of scissor levers 42 causes variation in spacings between fixed track 28 and each movable track 30, whereby movable tracks 30 are capable of movement between a relatively compact, even spacing corresponding to the first position depicted in FIGS. 2 and 5, and a relatively extended, paired uneven spacing corresponding to the second position as depicted in FIGS. 3 and 6.

Referring to FIGS. 1–8, parison receivers 50 are mounted on tracks 26, with each parison receiver 50 including tubular element 52 having open upper end 54, closed lower end 56, linear bearing 58, and an adapter plate 60 having a cam follower 61. A linear bearing 58 couples each lower end 56 to one of tracks 26 so that each tubular element 52 is mounted to and slidably movable along one of tracks 26. Base 18 is movable vertically with respect to frame 16 by actuator means 62 and inner and outer guide means 64 and 66, permitting parisons 13 to be inserted in and withdrawn from parison receivers 50.

Figure 8:
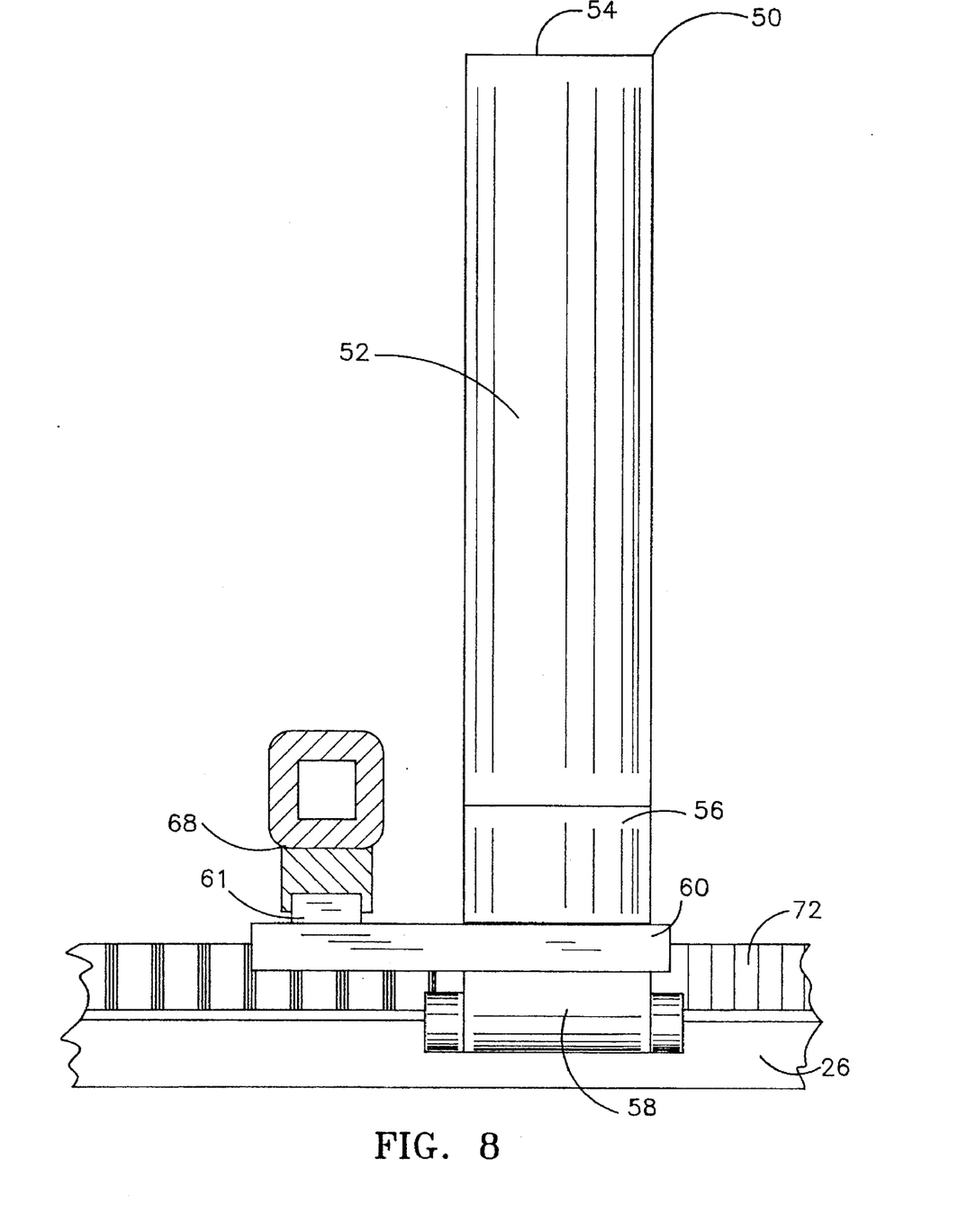
FIG. 8 is an enlarged fragmentary view of a parison receiver coupled to a track of an article repositioning apparatus for an injection stretch blow molding machine representing the present invention.

As described in application Ser. No. 08/359,037 filed Dec. 19, 1994 and entitled Take-Out and Cooling Apparatus, incorporated herein by reference, closed lower end 56 of each parison receiver 50 may include a vacuum channel coupled to a source of vacuum and to the interior of tubular element 52 by way of a sliding spool. The sliding spool may be captured within tubular element 52, and has a spool upper end which extends into an insert disposed within tubular element 52. Each tubular element 52 includes a pair of vertical vacuum channels and horizontal stub channels which couple the vacuum to a small annular space separating the lower portion of the spool from the interior surface of tubular element 52. The small annular space couples the vacuum to a second space existing between the bottom of the spool and closed lower end 56. A spring biases the spool away from closed lower end 56. The spool also includes vertical channels running from the bottom of the spool to a concave dished surface at the top of the spool, a circular channel, and a pair of intersecting horizontal channels terminating in the circular channel. The small dimension existing between the outer surface of the spool and the inner surface of tubular element 52 below the channel allows only a small flow of air down the interior of the insert through vertical channels into the second space. The throttling action of this close space insures that when the spool is situated separate from the interior of closed lower end, there is very little flow of air into the vacuum line. This small flow of air is sufficient to aid in the capture of parisons as will be described.

Figure 7:
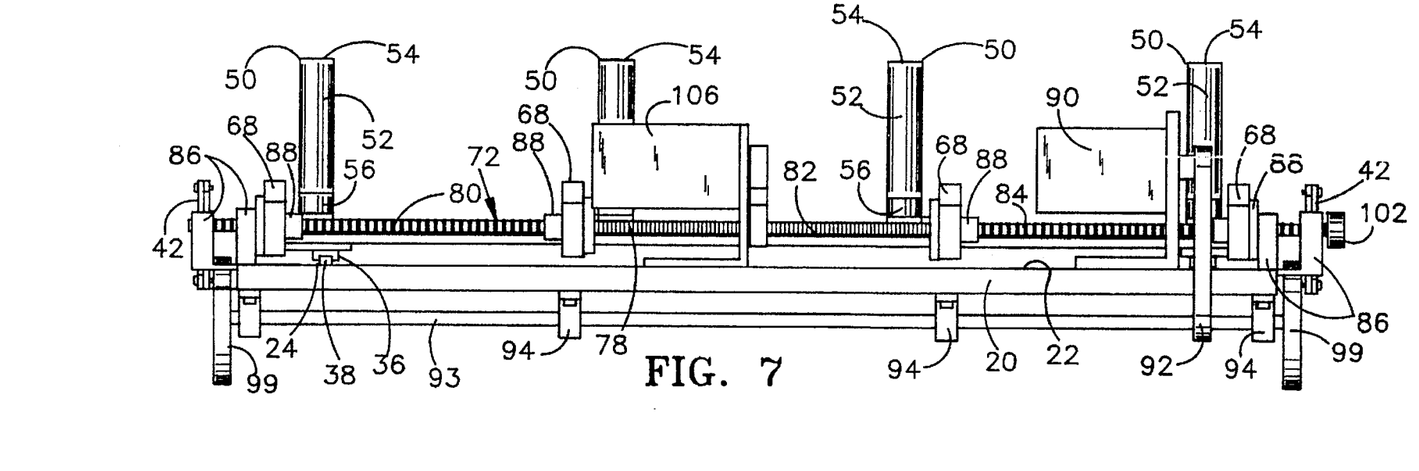
FIG. 7 is an end elevation view of an article repositioning apparatus for an injection stretch blow molding machine representing the present invention, taken along line 7—7 of FIG. 3.

As shown most clearly in FIGS. 2, 3 and 7, parallel aligning ribs 68 extend in the first direction, disposed parallel to ways 24 and coupled to cam followers 61 for aligning parison receivers 50 with respect to ways 24. As illustrated, four ribs 68 may be utilized with the twelve tracks 26 to cooperate with 48 parison receivers 50. Clearly, a greater or lesser number of ribs 68 may be utilized within the scope of the present invention. Coupling components 70 act to couple aligning ribs 68 together at preselected variable spacings therebetween. Coupling components 70 include a pair of ball screws 72, disposed in the second direction at opposite aligning ribs 68. Each ball screw 72 is formed to have a number of segments, divided into contiguous first segment group 74 having right-hand threads and contiguous second segment group 76 having left-hand threads. First segment group 74 includes first inner segment 78 and first outer segment 80, with the relatively fine thread pitch of first inner segment 78 less than the relatively coarse thread pitch of first outer segment 80. Similarly, second segment group 76 includes second inner segment 82 and second outer segment 84, with the relatively fine thread pitch of second inner segment 82 less than the relatively coarse thread pitch of second outer segment 84. Ball screws 72 are supported for rotation with respect to base 18 by ball screw bearings 86.

Coupling components 70 also include ball nuts 88, attached to aligning ribs 68 and threadably engaging ball screws 72, with each ball nut 88 engaging a member of first segment group 74 or second segment group 76 having corresponding thread pitch and sense. By simultaneous rotation of ball screws 72, aligning ribs 68 are movable through varying distances by virtue of attachment of aligning ribs 68 to ball nuts 88. As described, those aligning ribs 68 attached to ball nuts 88 engaged with first segment group 74 are thereby caused to move oppositely to aligning ribs 68 fixed to ball nuts 88 engaged with second segment group 76, due to first segment group 74 having threads of opposite sense to that of second segment group 76. In addition, as a result of the thread pitch of first inner segment 78 being less than the thread pitch of first outer segment 80, simultaneous rotation of ball screws 72 causes aligning ribs 68 fixed to ball nuts 88 engaged with first segment group 74 and disposed relatively more proximate to second segment group 76 to be moved through relatively smaller distances than aligning ribs 68 fixed to ball nuts 88 engaged with first segment group 74 and disposed relatively less proximate to second segment group 76. Similarly, as a result of the thread pitch of second inner segment 82 being less than the thread pitch of second outer segment 84, simultaneous rotation of ball screws 72 causes aligning ribs 68 fixed to ball nuts 88 engaged with second segment group 76 and disposed relatively more proximate to first segment group 74 to be moved through relatively smaller distances than aligning ribs 68 fixed to ball nuts 88 engaged with second segment group 76 and disposed relatively less proximate to first segment group 74. It will be understood that the use of four ribs 68 corresponds to each ball screw 72 including four segments, that is, first inner segment 78, first outer segment 80, second inner segment 82 and second outer segment 84. As described, it is within the scope of the present invention to utilize a greater or lesser number of ribs 68, in which event each ball screw 72 may be correspondingly divided into a greater or lesser number of segments, whereby each rib 68 is threadably coupled to a segment of each ball screw 72 having a particular thread pitch and sense. Specifically, where each ball screw 72 has a plurality of segments in first segment group 74 and second segment group 76, first segment group 74, having right-hand threads, is disposed in order of decreasing pitch, with the member of first segment group 74 having the least, finest pitch disposed adjacent to second segment group 76. In this way, aligning ribs 68 fixed to ball nuts 88 engaged with first segment group 74 move oppositely to those aligning ribs 68 fixed to ball nuts 88 engaged with second segment group 76, aligning ribs 68 fixed to ball nuts 88 engaged with first segment group 74 and disposed relatively more proximate to second segment group 76 moving through relatively smaller distances than aligning ribs 68 fixed to ball nuts 88 engaged with first segment group 74 and disposed relatively less proximate to second segment group 76. Similarly, second segment group 76, having left-hand threads, is disposed in order of decreasing pitch with the member of second segment group 76 having the least, finest pitch disposed adjacent to first segment group 74, whereby aligning ribs 68 fixed to ball nuts 88 engaged with second segment group 76 move oppositely to those aligning ribs 68 fixed to ball nuts 88 engaged with first segment group 74, aligning ribs 68 fixed to ball nuts 88 engaged with second segment group 76 and disposed relatively more proximate to first segment group 74 moving through relatively smaller distances than aligning ribs 68 fixed to ball nuts 88 engaged with second segment group 76 and disposed relatively less proximate to first segment group 74.

As shown in FIGS. 2–7, the movement of linking elements 40 is effectuated by reversible first servo motor 90 coupled to small drive pulley, not shown, using drive belt 92. The small drive pulley is attached to drive shaft 93 supported for rotation by drive shaft bearings 94. A large drive pulley 95 is attached to each end of drive shaft 93, and similarly, idler pulleys 96 are attached to each end of idler shaft 97 rotatably mounted through idler shaft bearings 98. Each large drive pulley 95 is rotatably coupled to an idler pulley 96 by a timing belt 99. Movable scissors levers 42 are coupled to timing belts 99 by timing belt clamps 100, so that first servo motor 90 acts to cause movable tracks 30, and hence parison receivers 50, to move in the first direction relative to base 18.

Also as shown in FIGS. 2–7, rotational movement of ball screws 72 is coupled together using ball screw coupling belt 102 mounted between a pair of ball screw pulleys 104. One ball screw pulley 104 is attached to each end of each ball screw 72, with reversible second servo motor 106 coupled to one ball screw 72. In this way, second servo motor 106 acts to produce movement of aligning ribs 68 in the second direction relative to base 18, thereby causing movement of parison receivers 50 in the second direction. A controller, not shown, coupled to first and second servo motors 90 and 106, respectively, is used to associate and coordinate movement of parison receivers 50 between spacings corresponding to the first position and the second position, by way of actuation of first servo motor 90 and contemporaneous actuation of second servo motor 106.

In use, machine 10 transports parisons 13 disposed with relative center spacings of the first position out of first work station 12, using transport means 108, to be positioned above parison receivers 50 of the present invention disposed in the first position, as shown in FIG. 1. Operation of actuator means 62 causes base 18 to move vertically upward, so that each parison 13 is placed into mating engagement with one parison receiver 50. As described in application Ser. No. 08/359,037 filed Dec. 19, 1994 and entitled Take-Out and Cooling Apparatus, parisons 13 handled by the present invention are generally of a test tube shape having a rounded bottom and having a support flange separating a lower body portion from a finish portion intended to engage a closure. The curvature of the dish-shaped upper surface of the spool is selected to conform generally to the outer surface of the bottom end of a parison 13. Upon insertion of a parison 13 into a parison receiver 50, the upper ends of the vertical channels are obstructed, thus substantially restricting the flow of air down the vertical channels and into the second space. The absence of this flow of air causes the vacuum within the second space to increase which, in turn, results in a net downward force on the spool by air pressure acting on parison 13, the differential in air pressure overcoming the biasing force of the spring and producing a relative downward movement of the spool towards closed lower end 56. The downward translation of the spool couples the horizontal channels in tubular element 52 with the circular channel and the horizontal intersecting channels, effectively latching the spool in the downward position and maintaining a hard vacuum hold on parison 13 until forcibly removed. Parisons 13 are then released from transport means 108, and first servo motor 90 and second servo motor 106 are energized by the controller. First servo motor 90 produces movement of large drive pulleys 95 as coupled by way of the small drive pulley, drive belt 92, and drive shaft 93, with rotation of large drive pulleys 95 causing movement of timing belts 99. Each set of movable scissor levers 42, attached to a timing belt 99 by a timing belt clamp 100, expands as a result of translation of timing belt clamps 100 with movement of timing belt 99. During such expansion, each set of movable scissors 42 remains fixed at a point where attached to fixed track 28, with the remainder of each set of scissor levers 42 expanding relative to fixed track 28. Movable tracks 30 are thereby caused to translate with respect to fixed track 28, with way bearings sliding within ways 24.

In the first position, tracks 26 are disposed to be compact and evenly spaced, however, in the second position, corresponding to sets of scissors levers 42 as extended, tracks 26 are relatively separated and are disposed unevenly and pairwise, due to attachment of smaller scissor levers 46 and larger scissor levers 44 to members of first group of movable tracks 32 and second group of movable tracks 34 disposed in alternation. Second servo motor 106 provides drive directly to one ball screw 72, with coupling to the other ball screw 72 using ball screw coupling belts 102 and ball screw pulleys 104. Simultaneous rotation of ball screws 72 causes translation of aligning ribs 68 parallel to ball screws 72. Aligning ribs 68 attached to ball nuts 88 engaged with members of first segment group 74 move oppositely to those aligning ribs 68 fixed to ball nuts 88 engaged with members of second segment group 76, as first segment group 74 has threads of opposite sense to second segment group 76. Further, as the thread pitch of first inner segment 78 is less than the thread pitch of first outer segment 80, rotation of ball screws 72 causes aligning ribs 68 fixed to ball nuts 88 engaged with members of first segment group 74 and disposed relatively more proximate to second segment group 76 to be moved through relatively smaller distances than aligning ribs 68 fixed to ball nuts 88 engaged with first segment group 74 and disposed relatively less proximate to second segment group 76, and similarly, causes aligning ribs 68 fixed to ball nuts 88 engaged with second segment group 76 and disposed relatively more proximate to first segment group 75 to be moved through relatively smaller distances than aligning ribs 68 fixed to ball nuts 88 engaged with second segment group 76 and disposed relatively less proximate to first segment group 74. Hence, simultaneous rotation of ball nuts 88 causes parison receivers 50 to slidably translate along tracks 26, through attachment to aligning ribs 68 fixed to ball nuts 88, between a compact configuration corresponding to the first position and an extended configuration corresponding to the second position.

With parison receivers 50 moved from the first position to the second position, parisons 13 may thereafter be transported by machine 10 from the apparatus of the present invention to second work station 14, where further operations on parisons 13 may be performed. By causing the controller to reverse the direction of drive of first and second servo motors 90 and 106, tracks 26 and aligning ribs 68 may be caused to each move in the opposite sense as before, that is, from the second position back to the first position. Further, actuator means 62 may be operated to cause base 18 to move vertically downward, so that the present invention is once again ready for engagement with another set of parisons 13 emerging from first work station 12.

In a second embodiment, not shown, first servo motor 90 and second servo motor 106 may be replaced by a reversible single servo motor coupled to timing belts 99 and ball screws 72. The single servo motor may thus provide the motive force to cause movable tracks 30 to move in the first direction in response to action by movable scissors 42, and to cause aligning ribs 68 to move in the second direction in response to rotation of ball screws 72, thereby moving parison receivers 50 between the first and second positions.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. In a machine for simultaneously molding a plurality of containers from plastic parisons, the machine including a first work station wherein the parisons are disposed in a two-dimensional evenly spaced first position and a second work station wherein the parisons are disposed in a two-dimensional paired unevenly spaced second position, an apparatus for altering the spacings between the parisons between the first position and the second position comprising:

a base including at least a pair of ways;

a plurality of movable tracks, each said movable track coupled to said ways to permit movement with respect to said base;

linking elements, linking said movable tracks together to permit variation of spacings between said movable tracks;

a plurality of parison receivers, each parison receiver mounted to and slidably movable along one of said movable tracks;

positioning components, positioning said parison receivers along said movable tracks; and associating apparatus, associating said positioning components and said linking elements so that said parison receivers are movable between the first position and the second position.

2. The apparatus of claim 1 wherein said ways are parallel and extend in a first direction, and said movable tracks are parallel, extend in a second direction, and are movable in the first direction.

3. The apparatus of claim 2 further comprising:

a frame attached to the first and second work stations and coupled to said base; and means for moving said base vertically with respect to said frame, thereby permitting the parisons to be inserted in and withdrawn from said parison receivers.

4. The apparatus of claim 2 wherein said base comprises a plate having a generally planar surface and said ways each comprise a support rail fixed to said planar surface, thereby supporting said movable tracks for movement in the first direction.

5. The apparatus of claim 2 wherein each of said movable tracks comprises a rail having at least a pair of way bearings, said rails disposed adjacent to said base so that each of said way bearings engages one of said ways.

6. The apparatus of claim 2 further comprising a fixed track attached to said base and extending in the second direction, a plurality of fixed track parison receivers, each fixed track parison receiver mounted to and slidably movable along said fixed track, and fixed track receiver positioning components positioning said fixed track parison receivers along said fixed track, and wherein said linking elements comprise a set of movable scissor levers coupled to said fixed track and to each of said movable tracks whereby movement of said set of scissor levers causes variation in the spacings between said fixed track and each of said movable tracks.

7. The apparatus of claim 6 wherein said movable tracks comprise a first group of movable tracks and a second group of movable tracks, members of said first group of movable tracks interposed in alternating position with respect to members of said second group of movable tracks and said fixed track disposed adjacent to at least one member of said second group of movable tracks, and said set of scissor levers comprises smaller scissor levers coupled to said fixed track and to members of said first group of movable tracks, and larger scissor levers coupled to members of said second group of movable tracks and to said smaller scissor levers, whereby said movable tracks are movable between an even spacing corresponding to the first position and a paired uneven spacing corresponding to the second position.

8. The apparatus of claim 2 wherein said positioning components comprise:

a plurality of aligning ribs, each parison receiver attached to one of said aligning ribs; and coupling components for coupling together and permitting variation of spacings between said aligning ribs.

9. The apparatus of claim 8 wherein said aligning ribs are parallel and extend in a third direction.

10. The apparatus of claim 9 wherein said associating apparatus comprises:

a reversible servo motor coupled to said linking elements and to said coupling components, for moving said movable tracks and said aligning ribs relative to said base; and control means for controlling said servo motor.

11. The apparatus of claim 9 wherein said associating apparatus comprises:

a reversible first servo motor coupled to said linking elements, for moving said movable tracks relative to said base;

a reversible second servo motor coupled to said coupling components, for moving said aligning ribs relative to said base; and control means for controlling said first and second servo motors.

12. The apparatus of claim 9 wherein the first direction is orthogonal to the second direction.

13. The apparatus of claim 12 wherein the first direction is parallel to the third direction.

14. The apparatus of claim 9 wherein said coupling components comprise:

a ball screw;

a plurality of ball screw bearings rotatably supporting said ball screw with respect to said base;

a plurality of ball nuts engaging said ball screw, at least one of said ball nuts fixed to each of said aligning ribs, said aligning ribs movable by rotation of said ball screw between spacings corresponding to the first position and the second position.

15. The apparatus of claim 14 wherein said ball screw comprises a plurality of segments, each segment having a pre-selected thread sense and pitch, and at least one of said ball nuts has the thread sense and pitch of and engages each of said segments, whereby said aligning ribs are movable through varying distances by rotation of said ball screw.

16. The apparatus of claim 15 wherein said segments comprise a contiguous first segment group and a contiguous second segment group, said first segment group having right-hand threads and said second segment group having left-hand threads, whereby rotation of said ball screw causes said aligning ribs fixed to said ball nuts engaged with said first segment group to move oppositely to said aligning ribs fixed to said ball nuts engaged with said second segment group.

17. The apparatus of claim 16 wherein:

said first segment group is disposed in order of decreasing pitch with the member of said first segment group having the least pitch disposed adjacent to said second segment group, whereby rotation of said ball screw causes said aligning ribs fixed to said ball nuts engaged with said first segment group and disposed relatively more proximate to said second segment group to be moved through relatively smaller distances than said aligning ribs fixed to said ball nuts engaged with said first segment group and disposed relatively less proximate to said second segment group; and said second segment group is disposed in order of decreasing pitch with the member of said second segment group having the least pitch disposed adjacent to said first segment group, whereby rotation of said ball screw causes said aligning ribs fixed to said ball nuts engaged with said second segment group and disposed relatively more proximate to said first segment group to be moved through relatively smaller distances than said aligning ribs fixed to said ball nuts engaged with said second segment group and disposed relatively less proximate to said first segment group.

18. The apparatus of claim 8 wherein each of said parison receivers comprises:

a tubular element having an open upper end and a closed lower end;

a bearing attached to said lower end so that said tubular element is mounted to and slidably movable along one of said movable tracks; and an adapter plate having a cam follower, coupling said tubular element to one of said aligning ribs.

19. In a machine for simultaneously molding a plurality of containers from plastic parisons, the machine including a first work station wherein the parisons are disposed in a compact two-dimensional evenly spaced first position and a second work station wherein the parisons are disposed in an extended two-dimensional paired unevenly spaced second position, an apparatus for altering the spacings between the parisons between the first position and the second position comprising:

a frame attached to said first and second work stations;

a base coupled and vertically movable with respect to said frame;

at least a pair of parallel ways extending in a first direction and coupled to said base;

a plurality of parallel tracks extending in a second direction orthogonal to the first direction, including a fixed track and a plurality of movable tracks;

a plurality of way bearings mounted to said movable tracks and engaging said ways, whereby each said movable track is coupled to at least two of said ways and movable in the first direction;

linking elements coupled together and to said tracks to permit variation of spacings between said tracks;

a plurality of parison receivers mounted on said tracks, each parison receiver including a tubular element having an open upper end, a closed lower end, a bearing, and an adapter plate having a cam follower, said bearing coupling said lower end to one of said tracks so that said tubular element is mounted to and slidably movable along one of said tracks;

means for moving said base vertically with respect to said frame, thereby permitting the parisons to be inserted in and withdrawn from said parison receivers;

a plurality of parallel aligning ribs extending in the first direction and aligning said parison receivers with respect to said ways, each of said cam followers coupled to one of said aligning ribs;

coupling components, coupling said aligning ribs together at preselected variable spacings between said aligning ribs; and associating apparatus, associating said coupling components and said linking elements for coordinating movement of said parison receivers between spacings corresponding to the first position and spacings corresponding to the second position.

20. The apparatus of claim 19 wherein said associating apparatus comprises:

a reversible first servo motor coupled to said linking elements, for moving said movable tracks relative to said base;

a reversible second servo motor coupled to said coupling components, for moving said aligning ribs relative to said base; and control means for controlling said first and second servo motors.

21. The apparatus of claim 19 wherein said associating apparatus comprises:

a reversible servo motor coupled to said linking elements and to said coupling components, for moving said movable tracks and said aligning ribs relative to said base; and control means for controlling said servo motor.

22. The apparatus of claim 19 wherein said base comprises a plate having a generally planar surface and said ways each comprise a support rail fixed to said planar surface, thereby supporting said movable tracks for movement in the first direction.

23. The apparatus of claim 19 wherein said linking elements comprise a set of movable scissor levers coupled to said fixed track and to each of said movable tracks, the movement of said set of scissor levers causing variation in the spacings between said fixed track and each of said movable tracks.

24. The apparatus of claim 23 wherein said movable tracks comprise a first group of movable tracks and a second group of movable tracks, members of said first group of movable tracks interposed in alternating position with respect to members of said second group of movable tracks and said fixed track disposed adjacent to at least one member of said second group of movable tracks, and said set of scissor levers comprises smaller scissor levers coupled to said fixed track and to members of said first group of movable tracks, and larger scissor levers coupled to members of said second group of movable tracks and to said smaller scissor levers, whereby said movable tracks are movable between a relatively compact, even spacing corresponding to the first position and a relatively extended, paired uneven spacing corresponding to the second position.

25. The apparatus of claim 19 wherein said coupling components comprise:

a ball screw;

a plurality of ball screw bearings rotatably supporting said ball screw with respect to said base; and a plurality of ball nuts engaging said ball screw, at least one of said ball nuts fixed to each of said aligning ribs, said aligning ribs movable by rotation of said ball screw between spacing corresponding to the first position and the second position.

26. The apparatus of claim 25 wherein said ball screw comprises a plurality of segments, each segment having a pre-selected thread sense and pitch, and at least one of said ball nuts has the thread sense and pitch of and engages each of said segments, whereby said aligning ribs are movable through varying distances by rotation of said ball screw.

27. The apparatus of claim 26 wherein said segments comprise a contiguous first segment group and a contiguous second segment group, said first segment group having right-hand threads and said second segment group having left-hand threads, whereby rotation of said ball screw causes said aligning ribs fixed to said ball nuts engaged with said first segment group to move oppositely to said aligning ribs fixed to said ball nuts engaged with said second segment group.

28. The apparatus of claim 27 wherein:

said first segment group is disposed in order of decreasing pitch with the member of said first segment group having the least pitch disposed adjacent to said second segment group, whereby rotation of said ball screw causes said aligning ribs fixed to said ball nuts engaged with said first segment group and disposed relatively more proximate to said second segment group to be moved through relatively smaller distances than said aligning ribs fixed to said ball nuts engaged with said first segment group and disposed relatively less proximate to said second segment group; and said second segment group is disposed in order of decreasing pitch with the member of said second segment group having the least pitch disposed adjacent to said first segment group, whereby rotation of said ball screw causes said aligning ribs fixed to said ball nuts engaged with said second segment group and disposed relatively more proximate to said first segment group to be moved through relatively smaller distances than said aligning ribs fixed to said ball nuts engaged with said second segment group and disposed relatively less proximate to said first segment group.

29. In a machine for simultaneously molding a plurality of containers from plastic parisons, the machine including a first work station wherein the parisons are disposed in a compact two-dimensional evenly spaced first position and a second work station wherein the parisons are disposed in an extended two-dimensional paired unevenly spaced second position, an apparatus for altering the spacings between the parisons between the first position and the second position comprising:

a frame attached to said first and second work stations;

a base coupled to said frame and having a plate with a generally planar surface;

a plurality of tracks extending in a second direction orthogonal to the first direction, including a fixed track and a plurality of movable tracks;

at least a pair of parallel ways extending in a first direction and coupled to said base, each of said ways including a support rail fixed to said planar surface, thereby supporting said movable tracks for movement in the first direction;

a plurality of way bearings mounted to said movable tracks and engaging said ways, whereby each said movable track is coupled to at least two of said ways and movable in the first direction;

at least a pair of sets of movable scissor levers, each set of movable scissor levers coupled to said fixed track and to each of said movable tracks, whereby movement of said sets of scissor levers causes variation in the spacings between said fixed track and each of said movable tracks;

a plurality of parison receivers mounted on said tracks, each parison receiver including a tubular element having an open upper end, a closed lower end, a bearing, and an adapter plate having a cam follower, said bearing coupling said lower end to one of said tracks so that said tubular element is mounted to and slidably movable along one of said tracks;

means for moving said base vertically with respect to said frame, thereby permitting the parisons to be inserted in and withdrawn from said parison receivers;

a plurality of parallel aligning ribs extending in the first direction and coupled to said cam followers for aligning said parison receivers with respect to said ways;

coupling components, coupling said aligning ribs together at preselected variable spacings between said aligning ribs; and associating apparatus, associating said coupling components and said sets of scissor levers for coordinating movement of said parison receivers between spacings corresponding to the first position and spacings corresponding to the second position.

30. The apparatus of claim 29 wherein said movable tracks comprise a first group of movable tracks and a second group of movable tracks, members of said first group of movable tracks interposed in alternating position with respect to members of said second group of movable tracks and said fixed track disposed adjacent to at least one member of said second group of movable tracks, and said sets of scissor levers each comprises smaller scissor levers coupled to said fixed track and to members of said first group of movable tracks, and larger scissor levers coupled to members of said second group of movable tracks and to said smaller scissor levers, whereby said movable tracks are movable between a relatively compact, even spacing corresponding to the first position and a relatively extended, paired uneven spacing corresponding to the second position.

31. The apparatus of claim 30 wherein said coupling components comprise:

at least a pair of ball screws, each of said ball screws having a plurality of segments, each segment having a pre-selected thread sense and pitch;

a plurality of ball screw bearings rotatably supporting said ball screws with respect to said base; and a plurality of ball nuts, each engaging one of said ball screws, at least one of said ball nuts fixed to each of said aligning ribs and having the thread sense and pitch of and engaging one of said segments, whereby said aligning ribs are movable through varying distances by rotation of said ball screw.

32. The apparatus of claim 31 wherein each of said segments comprises a contiguous first segment group and a contiguous second segment group, said first segment group having right-hand threads and disposed in order of decreasing pitch with the member of said first segment group having the least pitch disposed adjacent to said second segment group, and said second segment group having left-hand threads and disposed in order of decreasing pitch with the member of said second segment group having the least pitch disposed adjacent to said first segment group, whereby rotation of said ball screw causes said aligning ribs fixed to said ball nuts engaged with said first segment group to move oppositely to said aligning ribs fixed to said ball nuts engaged with said second segment group, said aligning ribs fixed to said ball nuts engaged with said first segment group and disposed relatively more proximate to said second segment group thereby moving through relatively smaller distances than said aligning ribs fixed to said ball nuts engaged with said first segment group and disposed relatively less proximate to said second segment group, and said aligning ribs fixed to said ball nuts engaged with said second segment group and disposed relatively more proximate to said first segment group thereby moving through relatively smaller distances than said aligning ribs fixed to said ball nuts engaged with said second segment group and disposed relatively less proximate to said first segment group.

33. The apparatus of claim 32 wherein said associating apparatus comprises:

a reversible first servo motor coupled to said sets of scissor levers for moving said movable tracks relative to said base;

a reversible second servo motor coupled to said ball screws for moving said aligning ribs relative to said base; and control means for controlling said first and second servo motors.

34. The apparatus of claim 32 wherein said associating apparatus comprises:

a reversible servo motor coupled to said sets of scissor levers and to said ball screws for moving said movable tracks and said aligning ribs relative to said base; and control means for controlling said servo motor.

* * * * *